Aug. 4, 1931.    R. J. WARD    1,817,401

MIRROR

Filed May 28, 1928

Inventor,
Robert J. Ward
by Herbert W. Jenner
Attorney.

Patented Aug. 4, 1931

1,817,401

UNITED STATES PATENT OFFICE

ROBERT JABEZ WARD, OF ELVASTON, ENGLAND

MIRROR

Application filed May 28, 1928, Serial No. 281,327, and in Great Britain June 7, 1927.

This invention relates to improvements which are more particularly applicable to hand or toilet mirrors, and its object is to provide a more convenient mirror arrangement for obtaining a rear view of the head more particularly.

According to this invention, two mirrors are disposed on the respective ends of a bridge piece of a convenient shape and length, the said mirrors are set the one facing the other, and at such an angle to each other, that by placing one of the mirrors at the rear of the head for example, whilst the other is disposed directly in front of the eyes, a view of the rear of the head is clearly seen by looking into the mirror in front.

Referring to the accompanying drawings.

Fig. 1 is an elevation, and

Fig. 2 a plan of a mirror arrangement constructed according to my invention.

Figure 5:
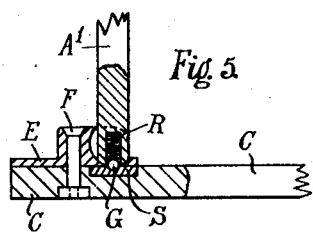

Fig. 5 a sectional view, and

Figure 6:
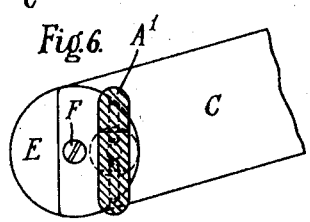

Fig. 6 a plan showing one of the hinged joints with the mirror erected.

Figure 7:
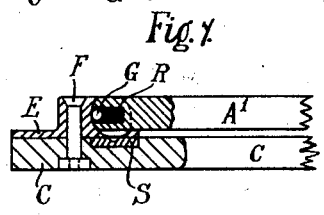

Fig. 7 is a corresponding view to Fig. 5, showing the mirror folded down.

Figs. 4 to 7 inclusive are drawn to a larger scale than the remaining figures.

Like letters indicate like parts throughout the drawings.

The arrangement described, when adapted for use as a portable toilet accessory, is for convenience constructed so that it can be folded up as shown in Figs. 1 to 7, so as to occupy little room when packed for transport.

Figure 1:
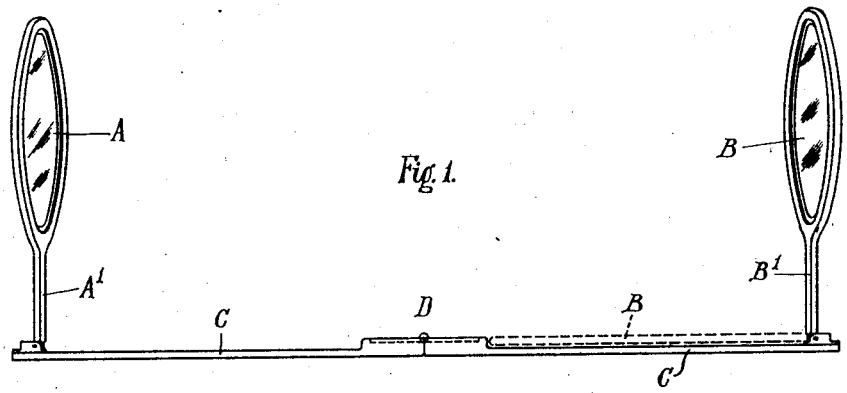
Figure 2:
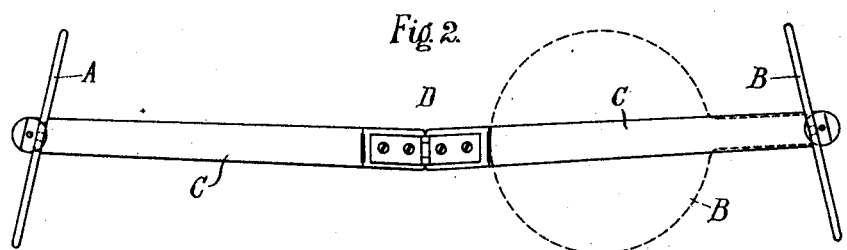

As shown in Figs. 1 and 2, the two mirrors A and B are formed with stems $A^1$ $B^1$ respectively, and the lower ends of these stems are hinged to the respective ends of a bridge piece C, so that they can be folded down on the latter.

Figure 3:
Fig. 3 shows the arrangement folded up.
Figure 4:
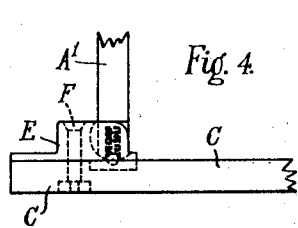
Fig. 4 is a side elevation.

In addition, the bridge piece C is formed of two equal parts hinged together at D in the middle, so that not only can the mirrors A and B be folded down on the bridge piece C, but one half of the latter can be folded over the other half, with the mirrors between them as shown in Fig. 3.

It will be seen by reference more particularly to Fig. 2, that the bridge piece C is not straight, but that one half is at an angle to the other half. This construction is adopted in order that the mirrors will assume the proper position when the bridge piece is placed over the shoulder of the user.

It will also be seen that the mirrors A and B are not parallel when erected, but are at an angle to each other, and in order to adjust and retain them at the proper angle, and also retain them erect when required, special provision is made for this purpose where the mirror stems $A^1$ and $B^1$ are jointed to the ends of the bridge piece C. This will be best understood by reference to Figs. 4 to 7, which show one of the said joints, that is, the one associated with the mirror A, drawn to a larger scale than Figs. 1 to 3.

In the construction here shown, the lower end of the mirror stem $A^1$ is hinged to a bracket E, the base of which is pivoted at F to the end of the bridge piece C, so that it can turn in the plane of the latter. Located in an opening in the lower extremity of the mirror stem $A^1$, is a ball G and a spring R, the latter of which tends to project the former G. When the mirror A is erected, the ball G described enters a hole in the base of the bracket E, and it further engages in a depression in a plate S, let into the bridge on the underside of the bracket E, when the mirror is adjusted at the correct angle. The ball G thus not only serves to hold the mirror A erect, but also holds it at the correct angle.

In using the arrangement described and shown in Figs. 1 to 3, the bridge piece C is rested upon the shoulder, with one mirror in front and the other at the rear, and the provision made and previously described, permits of the mirrors being instantly set in the correct angle for use without trial, so that no time is lost in this operation.

What I claim is:

1. In a duplex mirror, a bridge piece formed of two sections hinged together at their adjacent ends and foldable upwardly one upon the other, and mirrors provided with stems pivoted to the outer ends of the said sections and foldable downwardly upon them, said stems and mirrors being shorter than the said hinged sections and said mirrors being foldable upon each other back to back to form a compact structure when the said sections are folded upwardly one over the other.

2. In a duplex mirror, a bridge piece formed of two sections hinged together at their adjacent ends and provided with flat locking plates on their outer end portions, brackets pivoted to the outer end portions of the said sections and having openings over the locking plates, and foldable mirrors having stems which are pivoted to the said brackets and provided with spring-pressed locking devices which project through the said openings in the brackets and engage with the locking plates.

3. In a duplex mirror, a bridge piece formed of two straight sections hinged together by a horizontal pin at their adjacent ends and foldable upwardly one upon the other and arranged to form an angle laterally with each other when spread out in a horizontal plane, brackets pivoted to the outer end portions of the said sections by vertical pins, and mirrors pivoted to the said brackets by horizontal pins, said mirrors being shorter than the said sections and being foldable downwardly upon them, and forming with them a compact structure when the sections are folded upwardly to place the mirrors in contact with each other.

In testimony whereof I have affixed my signature.

ROBERT JABEZ WARD.